United States Patent
Doucet et al.

(10) Patent No.: US 9,624,684 B2
(45) Date of Patent: Apr. 18, 2017

(54) WIND TURBINE TOWER ASSEMBLY

(71) Applicant: MARMEN INC., Trois-Rivieres (CA)

(72) Inventors: Jerome Doucet, Trois-Rivieres (CA); Mathieu Cyrenne, St-Maurice (CA)

(73) Assignee: MARMEN INC., Trois-Rivieres, Quebec (CA)

( * ) Notice: Subject to any disclaimer, the term of this patent is extended or adjusted under 35 U.S.C. 154(b) by 52 days.

(21) Appl. No.: 14/440,296

(22) PCT Filed: Oct. 30, 2013

(86) PCT No.: PCT/CA2013/050820
§ 371 (c)(1),
(2) Date: May 1, 2015

(87) PCT Pub. No.: WO2014/067001
PCT Pub. Date: May 8, 2014

(65) Prior Publication Data
US 2015/0316035 A1 Nov. 5, 2015

Related U.S. Application Data
(60) Provisional application No. 61/721,236, filed on Nov. 1, 2012.

(51) Int. Cl.
*E04H 12/08* (2006.01)
*F03D 11/04* (2006.01)
(Continued)

(52) U.S. Cl.
CPC ........... *E04H 12/08* (2013.01); *E04B 1/1903* (2013.01); *E04C 3/30* (2013.01); *E04H 12/10* (2013.01);
(Continued)

(58) Field of Classification Search
None
See application file for complete search history.

(56) References Cited

U.S. PATENT DOCUMENTS 687,200 A * 11/1901 Conger ................... E04H 12/10
52/651.04
835,279 A * 11/1906 Haskell ................... E04H 12/10
52/651.02
(Continued)

FOREIGN PATENT DOCUMENTS

EP 1677006 A2 7/2006
EP 1857670 A1 11/2007
(Continued)

OTHER PUBLICATIONS

International Search Report for corresponding International Patent Application No. PCT/CA2013/050820 mailed Jan. 23, 2014.

*Primary Examiner* — Rodney Mintz
(74) *Attorney, Agent, or Firm* — Merchant & Gould P.C.

(57) ABSTRACT

A structural tower for a wind turbine assembly, includes along at least a base section: a plurality of peripheral sections extending peripherally of a central section. Each includes a convex-shaped wall having two longitudinal side edges and an inner framework connected to a respective one of the convex-shaped walls and extending inwardly therein. The inner framework includes spaced-apart transversal structural members connecting the two longitudinal side edges of the convex-shaped walls together and pairs of connecting structural members extending inwardly towards the central section. Each connecting structural member of a pair has a peripheral end connected to a respective one of the longitudinal side edges and an inner end connected to an inner end of a respective one of the connecting structural (Continued)

members of an adjacent one of the peripheral sections to define a structural concavity in the structural tower between adjacent peripheral sections.

26 Claims, 8 Drawing Sheets

(51) Int. Cl.
E04C 3/30 (2006.01)
E04B 1/19 (2006.01)
E04H 12/34 (2006.01)
E04H 12/10 (2006.01)
E04H 12/00 (2006.01)
F03D 13/20 (2016.01)

(52) U.S. Cl.
CPC ............ E04H 12/34 (2013.01); F03D 13/20 (2016.05); E04H 2012/006 (2013.01); F05B 2240/912 (2013.01); F05B 2240/9121 (2013.01); Y02E 10/728 (2013.01)

(56) References Cited

U.S. PATENT DOCUMENTS

| | | | |
|---|---|---|---|
| 835,280 A * | 11/1906 | Haskell | E04H 12/10 52/651.04 |
| 835,281 A * | 11/1906 | Haskell | E04H 12/10 52/651.04 |
| 969,859 A * | 9/1910 | Haskell | E04H 12/10 29/897.33 |
| 969,860 A * | 9/1910 | Haskell | E04H 12/10 52/651.04 |
| 969,862 A * | 9/1910 | Haskell | E04H 12/10 403/389 |
| 1,745,577 A * | 2/1930 | Klovrza | E04H 12/10 52/651.08 |
| 1,793,928 A * | 2/1931 | Hammel | E04H 12/10 29/897.33 |
| 3,053,398 A | 9/1962 | Liebherr et al. | |
| 3,447,276 A * | 6/1969 | Svensson | E04H 12/08 52/651.01 |
| 5,182,458 A | 1/1993 | McConachy | |
| 6,094,881 A * | 8/2000 | Lockwood | E04C 3/28 29/897.33 |
| 6,357,549 B1 | 3/2002 | Brennan et al. | |
| 6,594,960 B2 * | 7/2003 | Brittain | E21B 15/00 175/202 |
| 7,464,512 B1 * | 12/2008 | Perina | E04H 12/08 52/651.01 |
| 7,877,935 B2 | 2/2011 | Ollgaard | |
| 8,136,329 B2 | 3/2012 | Willis | |
| 8,910,446 B2 * | 12/2014 | Oliphant | E04H 12/10 52/40 |
| 9,062,662 B1 * | 6/2015 | Johnson | E04H 12/342 |
| D760,165 S * | 6/2016 | Doucet | D13/115 |
| 2004/0004578 A1 * | 1/2004 | Steinkamp | H01Q 1/1242 343/874 |
| 2005/0166521 A1 * | 8/2005 | Silber | E04H 12/10 52/633 |
| 2006/0213145 A1 * | 9/2006 | Haller | E04H 12/34 52/651.01 |
| 2006/0228218 A1 * | 10/2006 | Cone | E04H 12/085 416/244 A |
| 2006/0236648 A1 * | 10/2006 | Grundman | E04C 3/30 52/848 |
| 2006/0277843 A1 * | 12/2006 | Livingston | E04H 12/10 52/110 |
| 2007/0095008 A1 | 5/2007 | Arsene | |
| 2007/0151194 A1 * | 7/2007 | Livingston | B66C 23/06 52/651.05 |
| 2007/0294955 A1 | 12/2007 | Sportel | |
| 2008/0078128 A1 * | 4/2008 | Livingston | F03D 1/001 52/40 |
| 2009/0021019 A1 * | 1/2009 | Thomsen | E04H 12/085 290/55 |
| 2009/0031639 A1 * | 2/2009 | Cortina/Cordero | E04H 12/12 52/40 |
| 2009/0307998 A1 * | 12/2009 | Zavitz | E04H 12/12 52/152 |
| 2010/0132299 A1 * | 6/2010 | Sathian | F03D 1/001 52/651.01 |
| 2010/0139181 A1 | 6/2010 | Cortina-Cordero et al. | |
| 2010/0162652 A1 * | 7/2010 | Croes | E04H 12/085 52/651.01 |
| 2010/0192503 A1 | 8/2010 | Prasss | |
| 2010/0236161 A1 | 9/2010 | Livingston et al. | |
| 2010/0313497 A1 | 12/2010 | Jensen | |
| 2010/0319276 A1 | 12/2010 | Kryger et al. | |
| 2011/0133475 A1 * | 6/2011 | Zheng | E04H 12/10 290/55 |
| 2011/0138721 A1 | 6/2011 | Bagepalli et al. | |
| 2012/0023860 A1 * | 2/2012 | Voss | F03D 11/04 52/651.09 |
| 2012/0023864 A1 * | 2/2012 | Zheng | E04C 3/08 52/782.1 |
| 2012/0036798 A1 | 2/2012 | Holger | |
| 2012/0131877 A1 | 5/2012 | Fang et al. | |
| 2012/0174522 A1 * | 7/2012 | Gregor | E04H 12/06 52/651.01 |
| 2012/0210668 A1 * | 8/2012 | Kryger | E04H 7/22 52/645 |
| 2013/0298496 A1 * | 11/2013 | Uebbing | E04H 12/12 52/745.18 |
| 2014/0083022 A1 * | 3/2014 | Nummi | F03D 11/04 52/40 |
| 2014/0086747 A1 * | 3/2014 | Perley | F03D 7/0224 416/43 |
| 2014/0245671 A1 * | 9/2014 | Sritharan | F03D 11/04 52/173.1 |
| 2015/0037166 A1 * | 2/2015 | Venkatakrishnappa | F03D 11/0075 416/244 A |
| 2015/0052836 A1 * | 2/2015 | Kirkley | E04H 12/342 52/223.5 |
| 2015/0176299 A1 * | 6/2015 | Aranzadi De Miguel | E04H 12/342 52/79.4 |
| 2015/0247334 A1 * | 9/2015 | Fang | F03D 11/04 52/483.1 |
| 2015/0300037 A1 * | 10/2015 | Pellerin | F03D 1/001 52/173.1 |
| 2015/0316035 A1 * | 11/2015 | Doucet | F03D 11/04 52/651.07 |

FOREIGN PATENT DOCUMENTS

| | | |
|---|---|---|
| MX | 2007009456 A | 2/2009 |
| WO | 03083236 A1 | 10/2003 |
| WO | 2009097858 A1 | 8/2009 |
| WO | 2011154799 A2 | 12/2011 |

* cited by examiner

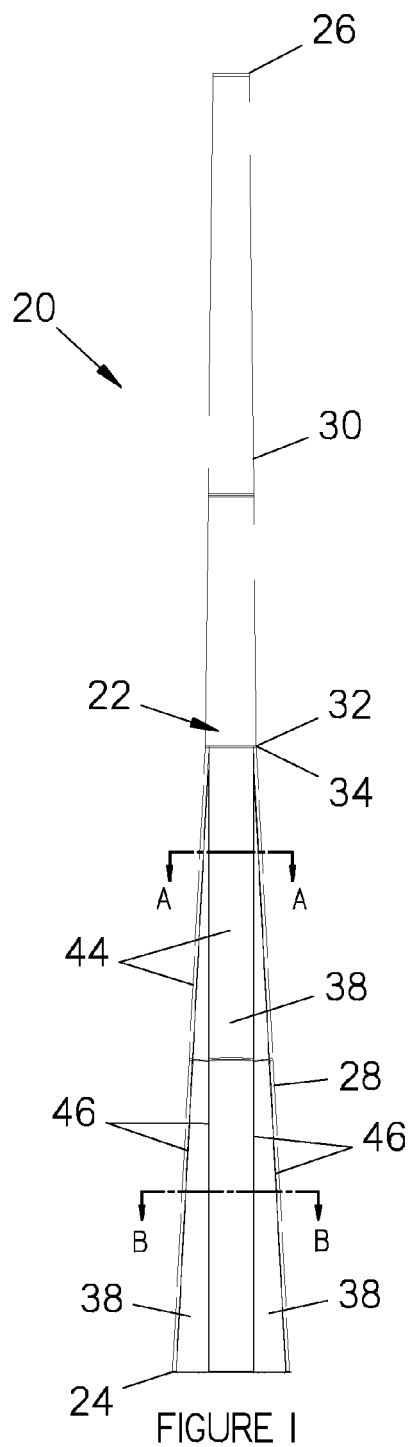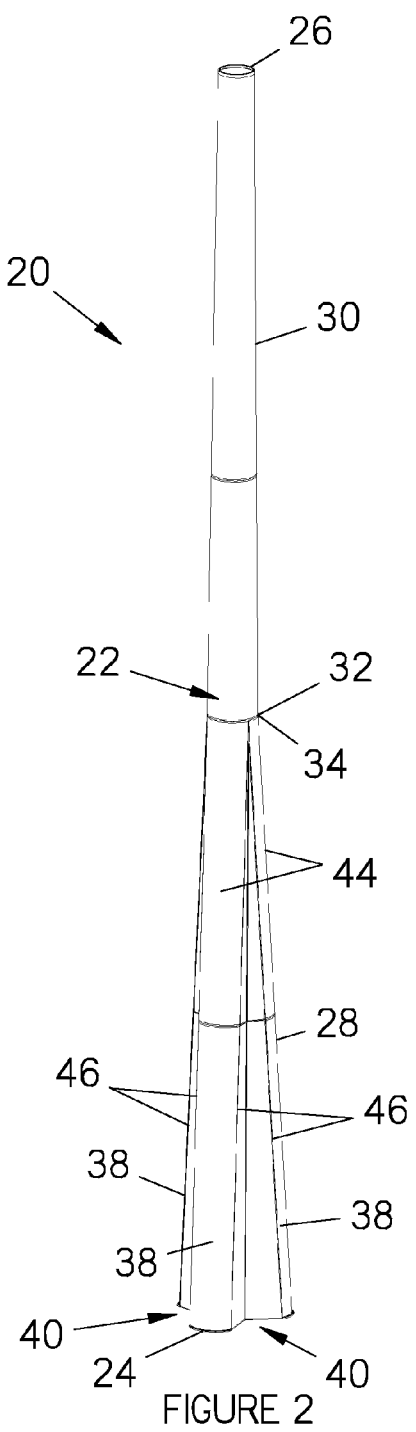

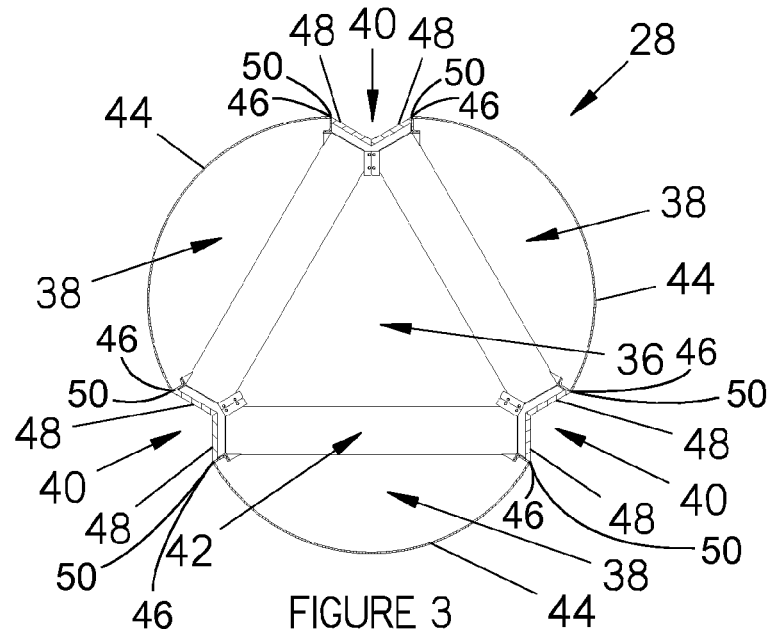
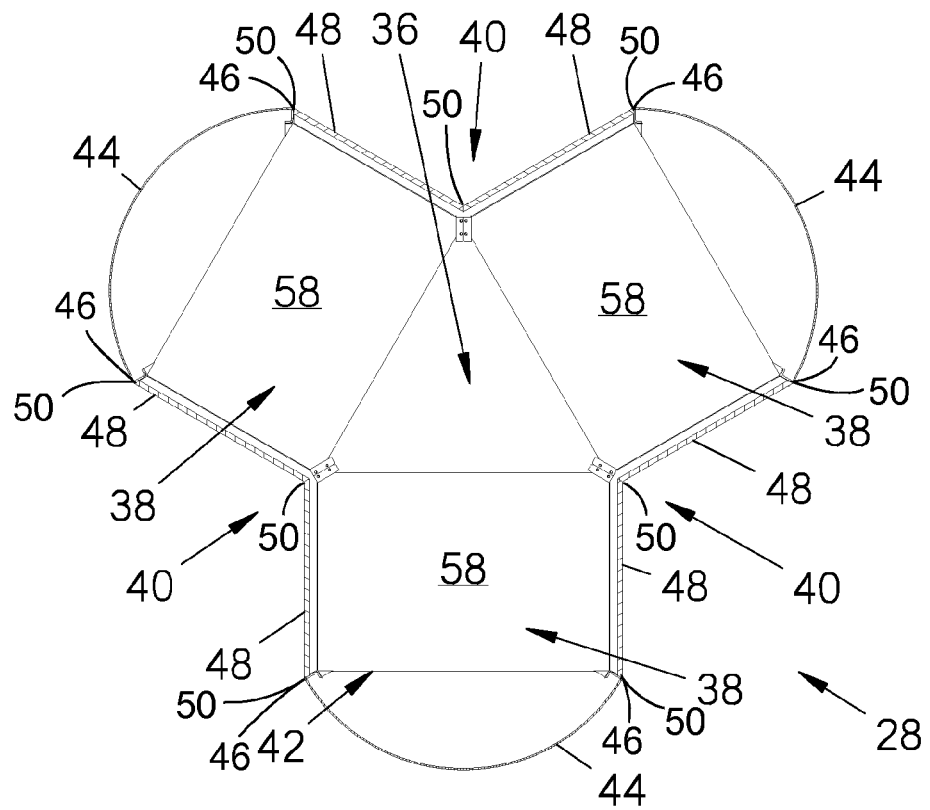

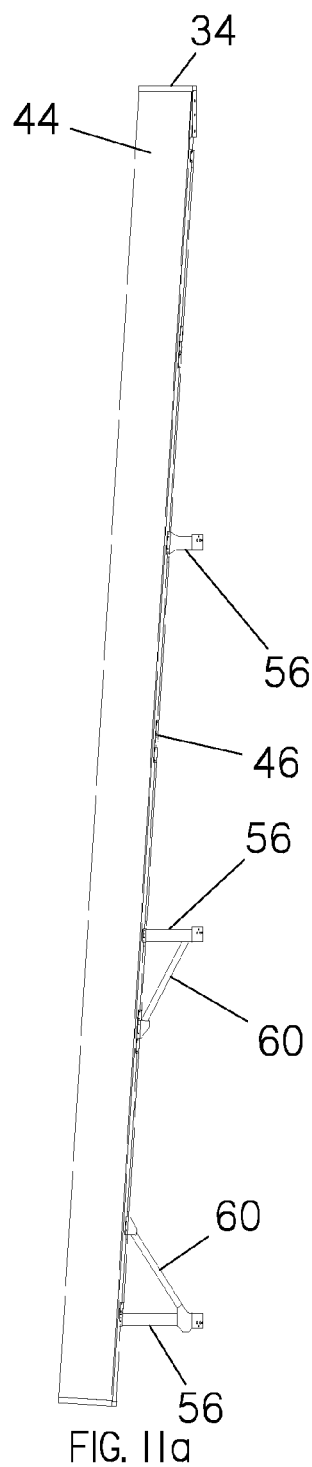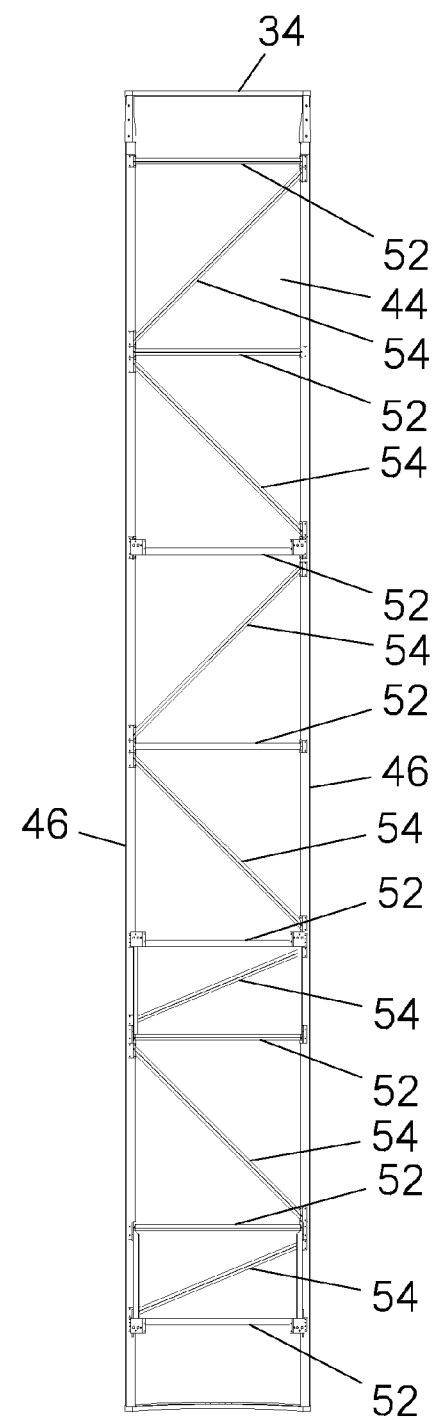
FIG. IIa  FIG. IIb
FIGURE II

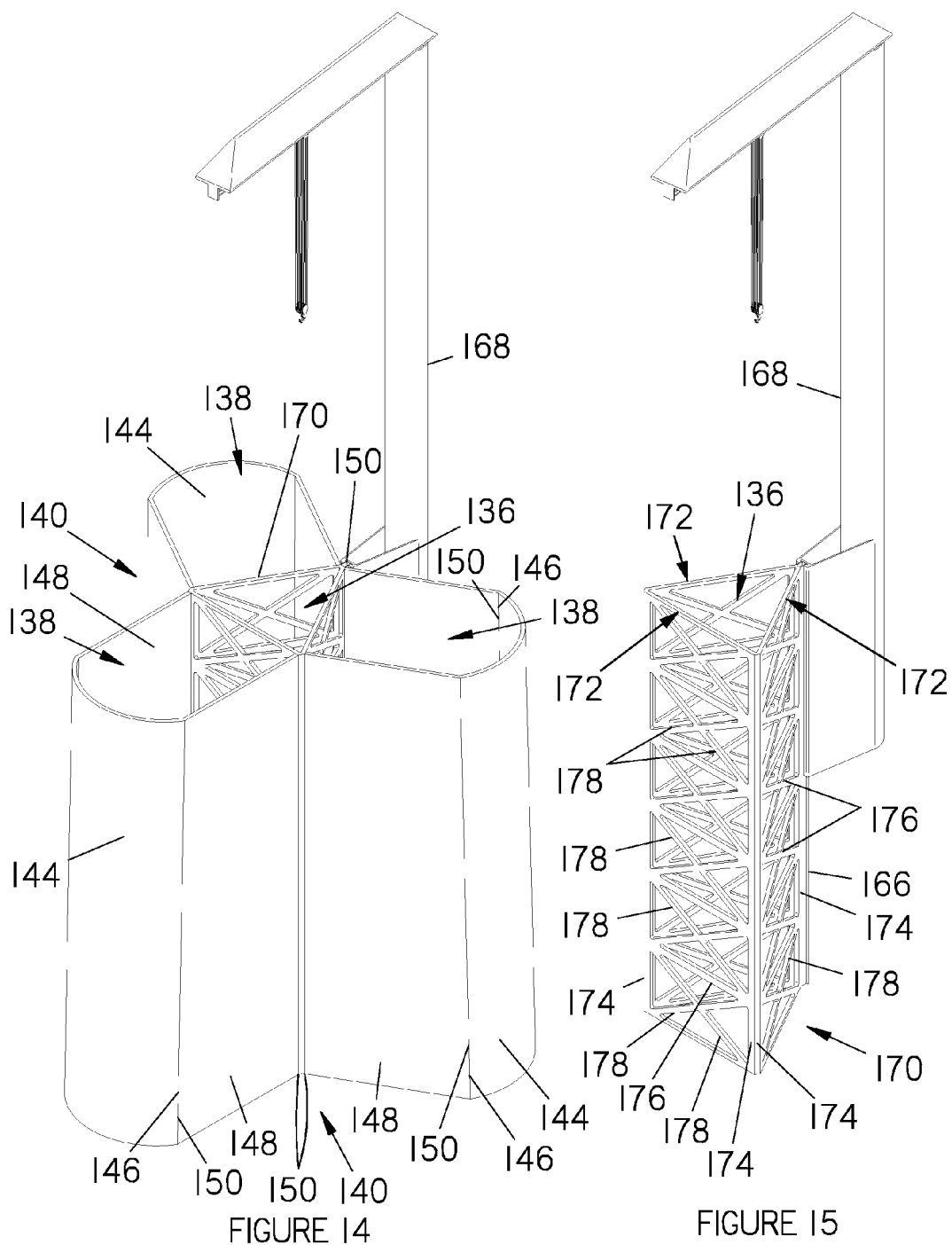

WIND TURBINE TOWER ASSEMBLY

CROSS-REFERENCE TO RELATED APPLICATIONS

This application is a National Stage Application of PCT/CA2013/050820, filed Oct. 30, 3013, which claims priority under 35USC§119(e) of US provisional patent application 61/721,236 filed on Nov. 1, 2012 and which applications are incorporated herein by reference. To the extent appropriate, a claim of priority is made to each of the above disclosed applications.

TECHNICAL FIELD OF THE INVENTION

The technical field relates to wind turbine tower assemblies and, more particularly, to structural towers for supporting a wind turbine and blade assembly.

BACKGROUND

Many known wind turbines include a tower and a rotor mounted on the top of the tower. Over the last years, the wind power industry has been growing with the trend towards taller towers since wind energy capacity curves improve with height because the wind profile is stronger. Several tower types have been designed, for instance, latticework structures, tubular steel structures, concrete structures, composite towers with steel and concrete, all having their drawbacks, especially for high wind turbine towers.

In general, the tower should be relatively easy to assemble at the mounting site and relatively pleasing to the eye. Furthermore, the tower components should be transportable on most roads, i.e. the size of the tower components being limited by the height of the bridges and tunnels and the width of the roads. As the tower size increases, it is necessary to design new towers where production, transport, and mounting can be effected in a relatively easy way.

BRIEF SUMMARY OF THE INVENTION

It is therefore an aim of the present invention to address the above mentioned issues.

According to a general aspect, there is provided a wind turbine tower assembly with a structural tower. The structural tower comprises: at least three convex-shaped walls having a lower end, an upper end, and two spaced-apart longitudinal side edges, the convex-shaped walls being configured in a tapered configuration from the lower end to the upper end thereof; and an inner framework connected to each of the convex-shaped walls, each of the inner frameworks comprising a plurality of transversal structural members connecting the two longitudinal side edges of a respective one of the convex-shaped walls and a plurality of connecting structural members having a peripheral end connected to one of the longitudinal side edges of the convex-shaped walls, and an inner end, and extending inwardly towards a central section of the structural tower, the transversal structural members being spaced-apart from one another along the longitudinal side edges, and the inner ends of two of the connecting structural members having their peripheral end connected to a different and adjacent one of the convex-shaped walls being connected to one another to define a structural concavity in the structural tower.

According to another general aspect, there is provided a structural tower for a wind turbine assembly. The structural tower comprises: a plurality of peripheral sections extending peripherally of a central section, each including a convex-shaped wall having two longitudinal side edges and an inner framework connected to a respective one of the convex-shaped walls and extending inwardly therein, the inner framework comprising a plurality of spaced-apart transversal structural members connecting the two longitudinal side edges of the respective one of the convex-shaped walls together and a plurality of pairs of connecting structural members extending inwardly towards the central section, each connecting structural member of a pair having a peripheral end connected to a respective one of the longitudinal side edges and an inner end connected to an inner end of a respective one of the connecting structural members of an adjacent one of the peripheral sections to define a structural concavity in the structural tower between adjacent peripheral sections.

According to still another general aspect, there is provided a structural tower for a wind turbine assembly. The structural tower comprises, along at least a base section thereof: a central section; and a plurality of peripheral sections extending peripherally of the central section. Each one of the peripheral sections includes a convex-shaped wall having two longitudinal side edges and an inner framework connected to a respective one of the convex-shaped walls and extending inwardly therein. The inner framework comprises a plurality of transversal structural members connecting the two longitudinal side edges of the respective one of the convex-shaped walls together and a plurality of pairs of connecting structural members extending inwardly towards the central section. Each connecting structural member of a pair has a peripheral end connected to a respective one of the longitudinal side edges and an inner end connected to an inner end of a respective one of the connecting structural members of an adjacent one of the peripheral sections to define a structural concavity in the structural tower between adjacent peripheral sections.

In an embodiment, the convex-shaped walls are configured in a tapered configuration from a lower end to an upper end thereof. Upper ends of the convex-shaped walls can be configured in an adjoining configuration.

In an embodiment, a cross-sectional area of the central section is substantially uniform along the base section.

In an embodiment, the peripheral sections extend radially from the central section.

In an embodiment, a cross-sectional area of the peripheral sections decreases from a lower end to an upper end of the base section.

In an embodiment, the central section is free of structural member extending therein.

In an embodiment, the structural concavities are free of structural member extending between two adjacent ones of the convex-shaped walls.

In an embodiment, a length of the connecting structural members decreases from a lower end to an upper end of the base section.

In an embodiment, a profile of each one of the convex-shaped walls is an arc of a circle.

In an embodiment, the connecting structural members extending from a respective one of the convex-shaped walls extend substantially parallel to one another.

In an embodiment, the transversal structural members connecting the two longitudinal side edges of a respective one of the convex-shaped walls are spaced apart and extend substantially parallel to one another.

In an embodiment, at least one of the transversal structural members extends between the pairs of the connecting structural members.

In an embodiment, the inner framework further comprises at least one platform secured to at least one of the pairs of the connecting structural members and extending therebetween.

In an embodiment, the inner framework further comprises structural members connecting the inner ends of the pairs of the connecting structural members.

In an embodiment, the structural tower further comprises at least one rail member extending at least partially along the structural tower. The at least one rail member can extend in at least one of the structural concavities. The at least one rail member can be connected to the connected inner ends of the connecting structural members.

In an embodiment, the structural tower further comprises side walls juxtaposed to the connecting structural members, outwardly thereof. The side walls can extend from the peripheral end to the inner end of the connecting structural members.

In an embodiment, the peripheral sections extend along the base section of the structural tower and the structural tower further comprises a frusto-connical upper section extending upwardly from an upper end of the base section. In an alternative embodiment, the base section extends from a lower end to an upper end of the structural tower.

In an embodiment, the base section has a substantially circular cross-section at an upper end thereof.

According to a further general aspect, there is provided a wind turbine tower assembly comprising a structural tower with a base section. The base section of the structural tower comprises: at least three convex-shaped walls, each one of the at least three convex-shaped walls having two spaced-apart longitudinal side edges; and an inner framework connected to each of the convex-shaped walls. Each of the inner frameworks comprises a plurality of transversal structural members connecting the two longitudinal side edges of a respective one of the convex-shaped walls and a plurality of connecting structural members having a peripheral end connected to one of the longitudinal side edges of the convex-shaped walls, and an inner end. The connecting structural members extend inwardly towards a central section of the base section of the structural tower with the inner ends being connected to the inner end of another one of the connecting structural members having its peripheral end connected to a different and adjacent one of the convex-shaped walls to define a structural concavity in the base section of the structural tower.

In an embodiment, the convex-shaped walls are configured in a tapered configuration from a lower end to an upper end of the base section. Upper ends of the convex-shaped walls can be configured in an adjoining configuration to define a central section of the base section of the structural tower. A cross-sectional area of the central section can be substantially uniform from the lower end to the upper end of the base section of the structural tower.

In an embodiment, each of the convex-shaped walls and corresponding ones of the connecting structural members having their peripheral end secured thereto define a peripheral section extending peripherally and radially from a central section of the base section of the structural tower. A cross-sectional area of the peripheral sections can decrease from a lower end to an upper end of the base section.

In an embodiment, the central section is free of structural member extending therein.

In an embodiment, the structural concavities are free of structural member extending between two adjacent ones of the convex-shaped walls.

In an embodiment, a length of the connecting structural members decreases from a lower end to an upper end of the base section.

In an embodiment, a profile of each one of the convex-shaped walls is an arc of a circle.

In an embodiment, the connecting structural members extending from a respective one of the convex-shaped walls extend substantially parallel to one another.

In an embodiment, the transversal structural members connecting the two longitudinal side edges of a respective one of the convex-shaped walls are spaced-apart from one another along the longitudinal side edges and extend substantially parallel to one another.

In an embodiment, the connecting structural members are provided in pairs extending from a respective one of the longitudinal side edges and wherein at least one of the transversal structural members extends between pairs of connecting structural members. The inner framework can further comprise at least one platform secured to one of the pairs of the connecting structural members and extending therebetween. The inner framework can further comprise structural members connecting the inner ends of the pairs of the connecting structural members.

In an embodiment, the wind turbine tower assembly further comprises at least one rail member extending at least partially along the structural tower. The at least one rail member can extend in at least one of the structural concavities. The at least one rail member can be connected to the connected inner ends of the connecting structural members.

In an embodiment, the structural tower further comprises side walls juxtaposed to the connecting structural members, outwardly thereof. The side walls can extend from the peripheral end to the inner end of the connecting structural members.

In an embodiment, the structural tower further comprises a frusto-connical upper section extending upwardly from an upper end of the base section.

In an alternative embodiment, the base section extends from a lower end to an upper end of the structural tower.

In an embodiment, the base section has a substantially circular cross-section at an upper end of the base section.

BRIEF DESCRIPTION OF THE DRAWINGS

FIG. 1 is a front elevation view of a wind turbine tower assembly in accordance with an embodiment;

FIG. 2 is a perspective view of the wind turbine tower assembly shown in FIG. 1;

FIG. 3 is a cross-sectional view of the wind turbine tower assembly along section lines A-A of FIG. 1;

FIG. 4 is a cross-sectional view of the wind turbine tower assembly along section lines B-B of FIG. 1;

FIGS. 10a and 10b, FIGS. 10a and 10b are respectively a side elevation view and a front elevation view of one of the peripheral sections shown in FIG. 8;

FIG. 11 includes FIGS. 11a and 11b, FIGS. 11a and 11b are respectively a side elevation view and a front elevation view of one of the peripheral sections shown in FIG. 9;

FIG. 14 is a top perspective view of a section of the wind turbine tower assembly shown in FIG. 12; and FIG. 15 is a perspective view of a section of the inner framework of the section of the wind turbine tower assembly shown in FIG. 14 including the longitudinally extending rail member.

It will be noted that throughout the appended drawings, like features are identified by like reference numerals.

DETAILED DESCRIPTION

Figure 5:
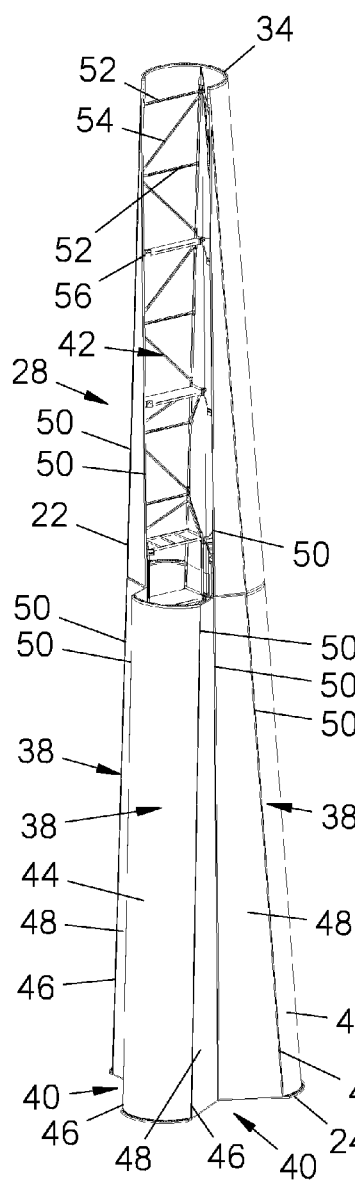
FIG. 5 is a perspective view of a base section of the wind turbine tower assembly shown in FIG. 1, wherein a peripheral section of an upper portion of the base section has been removed.

Referring now to the drawings and, more particularly, referring to FIGS. 1 and 2, there is shown a wind turbine tower assembly 20 in accordance with an embodiment. The wind turbine tower assembly comprises a structural tower 22 having a lower end 24 securable to a foundation (not shown) and an upper end 26 configured to receive a wind turbine and blade assembly (not shown).

The structural tower 22 is dividable along its length, between the lower end 24 and the upper end 26, into two main sections: a base section 28 extending upwardly from the lower end 24 and an upper section 30 extending downwardly from the upper end 26 and having a lower end 32 abutting an upper end 34 of the base section 28. The lower end of the base section 28 corresponds to the lower end 24 of the structural tower 22 and the upper end of the upper section 30 corresponds to the upper end 26 of the structural tower 22. The upper end 34 of the base section 28 is in register with the lower end 32 of the upper section 30.

The base section 28 and the upper section 30 are characterized by their cross-sectional shapes. In the embodiment shown, as shown in FIGS. 3 and 4, the base section 28 has a substantially clover shape with three leafs extending peripherally of a central section, as will be described in more details below. The cross-sectional area of the base section 28 tapers from the lower end 24 of the structural tower 22 towards the upper end 34 of the base section 28, i.e. the cross-sectional area of the base section 28 is wider near the lower end 24 than the upper end 34. The upper section 30 is a tube-like section and, more particularly, has a frustoconical shape. As the base section 28, the upper section 30 tapers from the lower end 32 thereof towards the upper end 26 of the structural tower 22, i.e. the cross-sectional area of the upper section 30 is wider near the lower end 32 than the upper end 26. In an alternative embodiment, the shape of the upper section 30 can differ. For instance and without being limitative, the upper section 30 can have the same cross-sectional area along its entire length. Furthermore, the external shape of the upper section 30 can differ from the one shown in the figures and described above.

In an alternative embodiment (not shown), it is appreciated that the structural tower 22 can be free of upper section 30 with a tube-like cross-section, i.e. the base section 28 having a clover leaf shape extends from the lower end 24 to the upper end 26 of the structural tower 22. Furthermore, the length of each one of the sections 28, 30 and the proportion of the sections 28, 30 can vary from the embodiment shown.

In a cross-sectional view, the base section 28 can be divided into one central section 36 and three peripheral sections 38 extending radially and peripherally from the central section 36. Structural concavities 40 are defined between adjacent peripheral sections 38 since the peripheral sections 38 are solely connected to one another at the periphery of the central section 36 and the structural tower 22 is free of structural members extending directly between two adjacent peripheral sections 38 without being oriented inwardly towards the central section 36.

As mentioned above, the cross-sectional area of the base section 28 decreases from the lower end 24 to the upper end 34. The cross-sectional area of the central section 36 remains substantially unchanged along the base section 28, while the cross-sectional area of the peripheral sections 38 decreases from the lower end 24 to the upper end 34. In the embodiment shown, at the upper end 34 of the base section 28, the cross-section of the base section 28 is substantially circular and in register with the lower end 32 of the upper section 30. More particularly, the upper ends of the convex-shaped walls 44 are configured in an adjoining configuration.

Figure 6:
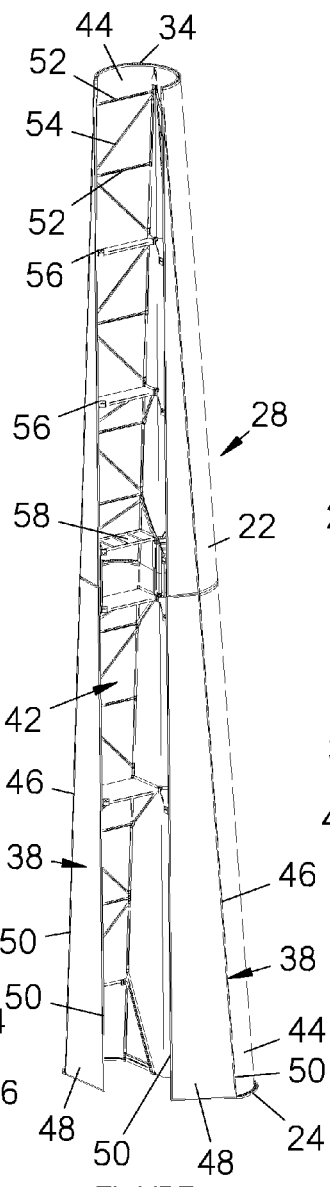
FIG. 6 is a perspective view of the base section of the wind turbine tower assembly shown in FIG. 1, wherein a peripheral section thereof has been removed.
Figure 7:
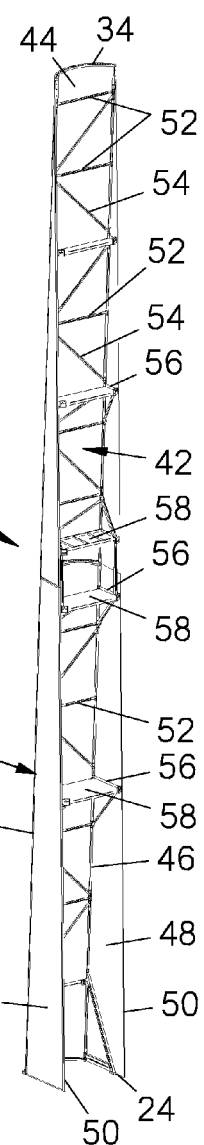
FIG. 7 is a perspective view of a peripheral section of the base section of the wind turbine tower assembly shown in FIG. 1.

Referring now to FIGS. 5 and 6, there is shown that the peripheral sections 38 further comprise an inner framework 42, which will be described in more details below. Each of the peripheral sections 38 includes a convex-shaped wall 44, which delimitates outwardly the peripheral sections 38. Each of the convex-shaped walls 44 ends with two longitudinal side edges 46, spaced apart from one another. The two longitudinal side edges 46 extend between the lower end 24 and the upper end 34 of the base section 28. In the embodiment shown, the convex-shaped walls 44 are shaped like the arc of a circle; however, the shape of the convex-shaped walls 44 can vary from the embodiment shown.

The peripheral sections 38 further include two side walls 48. Each one of the side walls 48 extends towards the central section 36 from a respective one of the longitudinal side edges 46 of the convex-shaped walls 44. As the convex-shaped walls 44, the side walls 48 comprise two longitudinal side edges 50, spaced apart from one another and extending between the lower end 24 and the upper end 34 of the base section 28. A first one of the longitudinal side edges 50, the peripheral longitudinal side edge, is juxtaposed to one of the longitudinal side edges 46 of the convex-shaped wall 44 and a second one of the longitudinal side edges 50, the inner longitudinal side edge, is juxtaposed to an inner longitudinal side edge 50 of a side wall 48 of an adjacent one of the peripheral sections 38, as will be described in more details below. In other words, the inner longitudinal side edges 50 of the side walls 48 are connected to another inner longitudinal side edge 50 of another side wall 48, adjacent thereto. The juxtaposed inner edges of the two side walls 48 are located inwardly of the convex-shaped walls 44. The two connected side walls 48 define an internal V-shaped angle and a structural concavity 40 in the base section 28 of the structural tower 22.

The convex-shaped walls 44 are configured in a tapered configuration from the lower end 24 to the upper end 34 of the base section 28. In the embodiment shown, the upper ends of the convex-shaped walls 44 are configured in an adjacent and abutted configuration to define the central section 36 of the structural tower 22. At the upper end 34 of the base section 28, the longitudinal side edges 46 of the convex-shaped walls 44 abut one another to define the circular cross-section. In the embodiment shown, the side walls 48 extend substantially vertically and their width decreases from the lower end 24 to the upper end 34 of the base section 28 of the structural tower 22. Thus, the side walls 48 have a substantially triangular shape.

Convex-shaped walls 44 and side walls 48 can include a plurality of wall panels, as shown in FIGS. 1, 2, 5, and 6, configured in an adjacent relationship to define the convex-shaped and side walls 44, 48 extending between lower end 24 and upper end 34 of the base section 28 of the structural tower 22. In an alternative embodiment, the panels defining the convex-shaped walls 44 and side walls 48 can extend continuously between the lower end 24 and the upper end 34 of the base section 28 of the structural tower 22.

In the embodiment shown, the two side walls 48 of each peripheral section 38 extend substantially parallel to one another. However, in alternative embodiments (not shown), they can diverge from one another from the peripheral longitudinal side edges 50, juxtaposed to one of the longitudinal side edges 46 of the convex-shaped wall 44, to the inner longitudinal side edges 50. In a non-limitative embodiment, they can diverge from one another and define an angle up to about 20° with a configuration wherein they extend substantially parallel to one another, i.e. an angle of up to about 40° is defined between both side walls 48. In still an alternative embodiment, the two side walls 48 can converge towards one another from the periphery towards the central section 36.

In the embodiment shown, the side walls 48 extend substantially vertically. However, in an alternative embodiment (not shown), the side walls can define an oblique angle with the ground (or foundation), i.e. an angle that is not a right angle or a multiple of a right angle.

In the embodiment shown, the central section 36 of the base section 28 has a substantially triangular cross-section. However, one skilled in the art will appreciate that the shape of the central section 36 can vary from the embodiment shown.

Referring now to FIGS. 7 to 11, there is shown an embodiment of the inner framework 42 which extends in the peripheral sections 38 of the base section 28 of the structural tower 22, inwardly of the convex-shaped walls 44. The inner framework 42 is a lattice framework (or open framework), extending substantially the entire length of the peripheral sections 38, from the lower end 24 to the upper end 34. The components of the inner framework 42 of each peripheral section 38 are connected directly or indirectly with the respective one of the convex-shaped wall 44. Furthermore, components of the inner framework 42 of each of the peripheral sections 38 are also connected to components of the inner framework 42 of another adjacent peripheral section 38, as will be described in more details below.

The inner framework 42 comprises a plurality of structural members, such as and without being limitative, metal strips, extending therein. The lattice framework 42 includes a plurality of transversal structural members 52 extending between and connecting the two longitudinal side edges 46 of each of the convex-shaped walls 44. The transversal structural members 52 extend substantially horizontally, parallel to one another and in a spaced-apart relationship along the length of the convex-shaped walls 44. The distance and the number of transversal structural members 52 can vary from the embodiment shown.

The inner framework 42 further includes diagonally extending structural members 54 which extend between two opposed ends of two consecutive transversal structural members 52. As the transversal structural members 52, the diagonally extending structural members 54 extend between and connect the two longitudinal side edges 46 of each of the convex-shaped walls 44 but instead of being oriented substantially horizontally, they have an end positioned above the other end thereof. Consecutive diagonally extending structural members 54 extend in opposite directions, i.e. an upper one of the diagonally extending structural members 54 has a first upper end mounted to a first longitudinal side edge 46 and a second lower end mounted to a second longitudinal side edge 46 and a lower one of the diagonally extending structural members 54, consecutive to the upper one, has a first upper end mounted to the second longitudinal side edge 46 and a second lower end mounted to the first longitudinal side edge 46. The ends of two consecutive diagonally extending structural members 54 are adjacent and abut the end of the transversal structural members 52 extending therebetween. In the embodiment shown, one transversal structural member 52 extends between two consecutive diagonally extending structural members 54. The distance and the number of diagonally extending structural members 54 can vary from the embodiment shown. Furthermore, their configuration with respect to the transversal structural members 52 can also vary from the embodiment shown.

The lattice framework further includes a plurality of connecting structural members (or members) 56 having a first peripheral end secured to one of the longitudinal side edges 46 and a second inner end, spaced-apart from the convex-shaped wall 44. The connecting structural members 56 extend inwardly towards the central section 36 of the base section 28 of the structural tower 22 and are provided in pairs. The connecting structural members 56 of each pair extend at about the same height, along the convex-shaped walls 44; each connecting structural member 56 of a pair extends from a respective one of the longitudinal side edges 46 of one of the convex-shaped walls 44. The connecting structural members 56 extend substantially horizontally, parallel to one another and in a spaced-apart relationship along the length of the convex-shaped walls 44. The inner ends of two of the connecting structural members 56 of adjacent peripheral sections 38 are connected to one another to define one of the structural concavities 40 in the base section 28 of the structural tower 22, i.e. the connecting point of the two connecting structural members 56 are located inwardly of the convex-shaped walls 44. The two connecting structural members 56 define an internal V-shaped angle.

As the convex-shaped walls 44 taper from the lower end 24 to the upper end 34 of the base section 28, the length of the connecting structural members 56 vary along the base section 28. The connecting structural members 56 mounted close to the lower end 24 are longer than the ones mounted close to the upper end 34. More particularly, the length of the connecting structural members 56 progressively decrease from the lower end 24 to the upper end 34 until the longitudinal side edges 46 of the convex-shaped walls 44 abut one another at the upper end 34.

In the embodiment shown, as the two side walls 48 of one peripheral section 38, the connecting structural members 56 of each pair extend substantially parallel to one another. However, in alternative embodiments (not shown), they can diverge from one another from the peripheral end, juxtaposed to one of the longitudinal side edges 46 of the convex-shaped wall 44, to the inner end. In a non-limitative embodiment, they can diverge from one another and define an angle up to about 20° with a configuration wherein they extend substantially parallel to one another, i.e. an angle of up to about 40° is defined between two connecting structural members 56. In still an alternative embodiment, the connecting structural members 56 of each pair can converge towards one another from the periphery towards the central section 36.

Each pair of connecting structural members 56 is substantially aligned vertically, along a longitudinal axis of the convex-shaped walls 44, with one of the transversal structural members 52. In the embodiment shown, the transversal structural members 52, aligned with the connecting structural members 56, are part of a structural platform 58 extending between the two connecting structural members 56 of a pair from the peripheral end to the inner end thereof. In an embodiment, the structural platforms 58 can be shorter than the connecting structural members 56. In another alternative embodiment, the structural platforms 58 can extend in the central section 36.

In a non-limiting embodiment, the structural platforms 58 include an outer structural frame including one or several transversal structural member(s) 52 and the connecting structural members 56, and support a floor member. They can further include an inner framework (not shown) extending between transversal structural member(s) 52 and the connecting structural members 56. The inner framework is mounted below the floor member and supports same. In an embodiment (not shown), the structural platforms 58 can be free of floor member and solely include the inner framework which extends between the transversal structural member(s) 52 and the connecting structural members 56 and reinforces the structural tower 22.

The lattice framework 42 further includes reinforcing structural members 60 extending either upwardly or downwardly from the connecting structural members 56 towards the longitudinal side edges 46 of the convex-shaped wall 44, i.e. the reinforcing structural members 60 have a first inner end secured to one of the connecting structural members 56 and a second peripheral end secured to the longitudinal side edge 46 from which the respective connecting structural member 56 extends inwardly. The peripheral end of the reinforcing structural members 60 can be secured to the longitudinal side edges 46 at about the same height than one of the transversal structural members 52, consecutive to the transversal structural member 52 from which the respective one of the connecting structural member 56 extends inwardly. In alternative implementations, the peripheral end of the reinforcing structural members 60 can be secured to the longitudinal side edges 46 and can be secured anywhere along the longitudinal side edge 46 and close to a non-consecutive transversal structural member 52. In the embodiment shown, the inner ends of the reinforcing structural members 60 are secured to a corresponding one of the connecting structural members 56, close to the inner end thereof. In an alternative embodiment (not shown), the inner ends of the reinforcing structural members 60 can be secured anywhere along the length of the corresponding one of the connecting structural members 56.

In the embodiment shown, each of the lattice framework 42 further includes two diagonally extending base structural members 62 and two horizontally extending base members 64. The diagonally extending base structural members 62 extend downwardly and inwardly from a respective one of the longitudinal side edges 46 of the convex-shaped wall 44 towards the foundation (not shown). The horizontally extending base members 64 extend inwardly and connect a respective one of the diagonally extending base structural members 62 and the longitudinal side edge 46 from which the respective one of the diagonally extending base structural members 62 extends.

In an embodiment (not shown), the structural tower 22 can be free of side walls 48 and the peripheral sections 38 can be connected to one another solely by the inner framework 42 and, more particularly, through the connecting structural members 56. In an alternative embodiment (not shown), the side walls 48 can be shorter than the length of the connecting structural members 56. In an embodiment, the side walls 48 are not structural components of the structural tower 22 but cover the inner framework 42 for aesthetic purposes.

Figure 8:
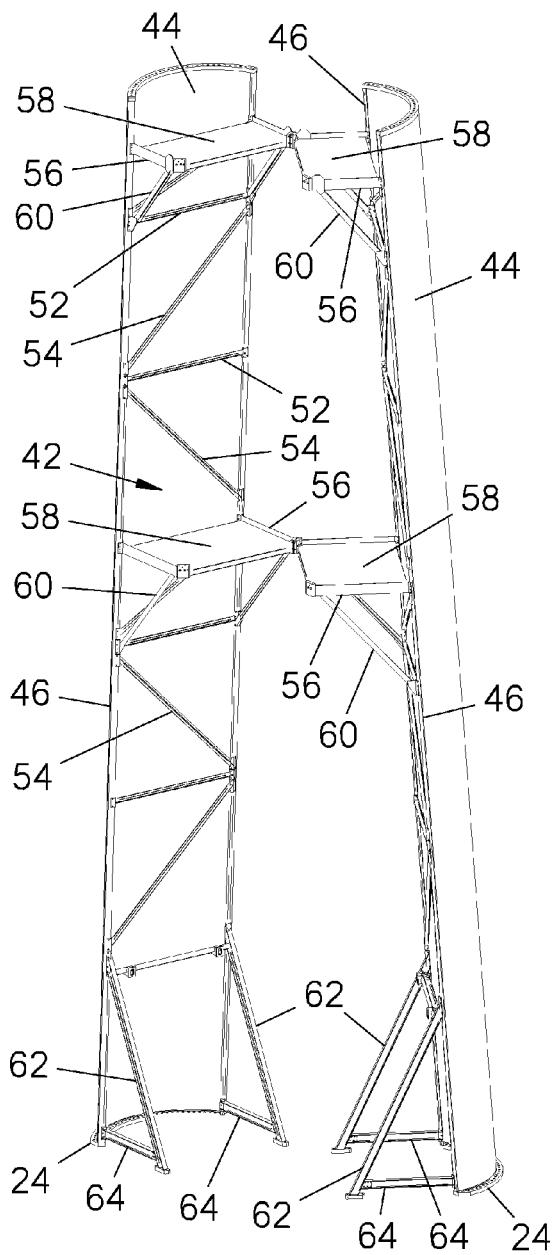
FIG. 8 is a perspective view of two peripheral sections of a lower portion of the base section of the wind turbine tower assembly shown in FIG. 1 configured in an adjacent configuration.
Figure 9:
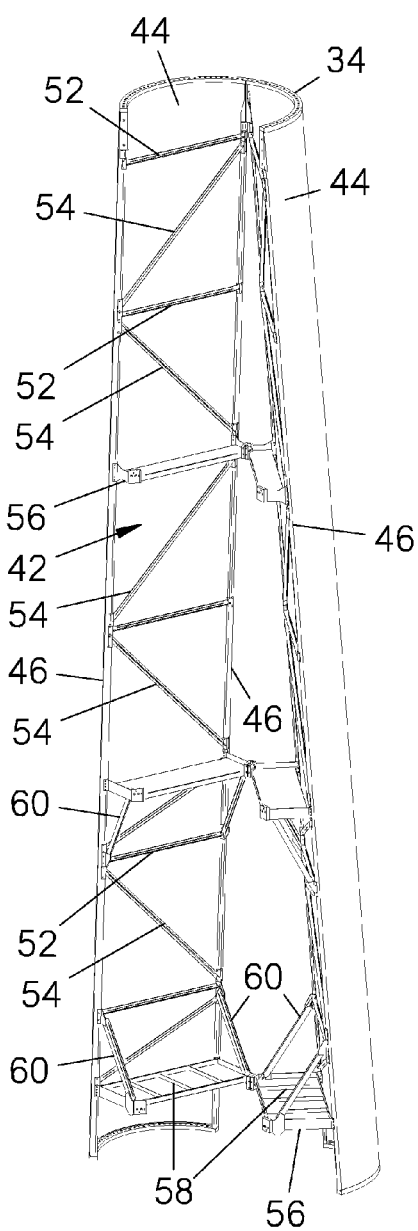
FIG. 9 is a perspective view of two peripheral sections of the upper portion of the base section of the wind turbine tower assembly shown in FIG. 1 configured in an adjacent configuration.
Figure 10:
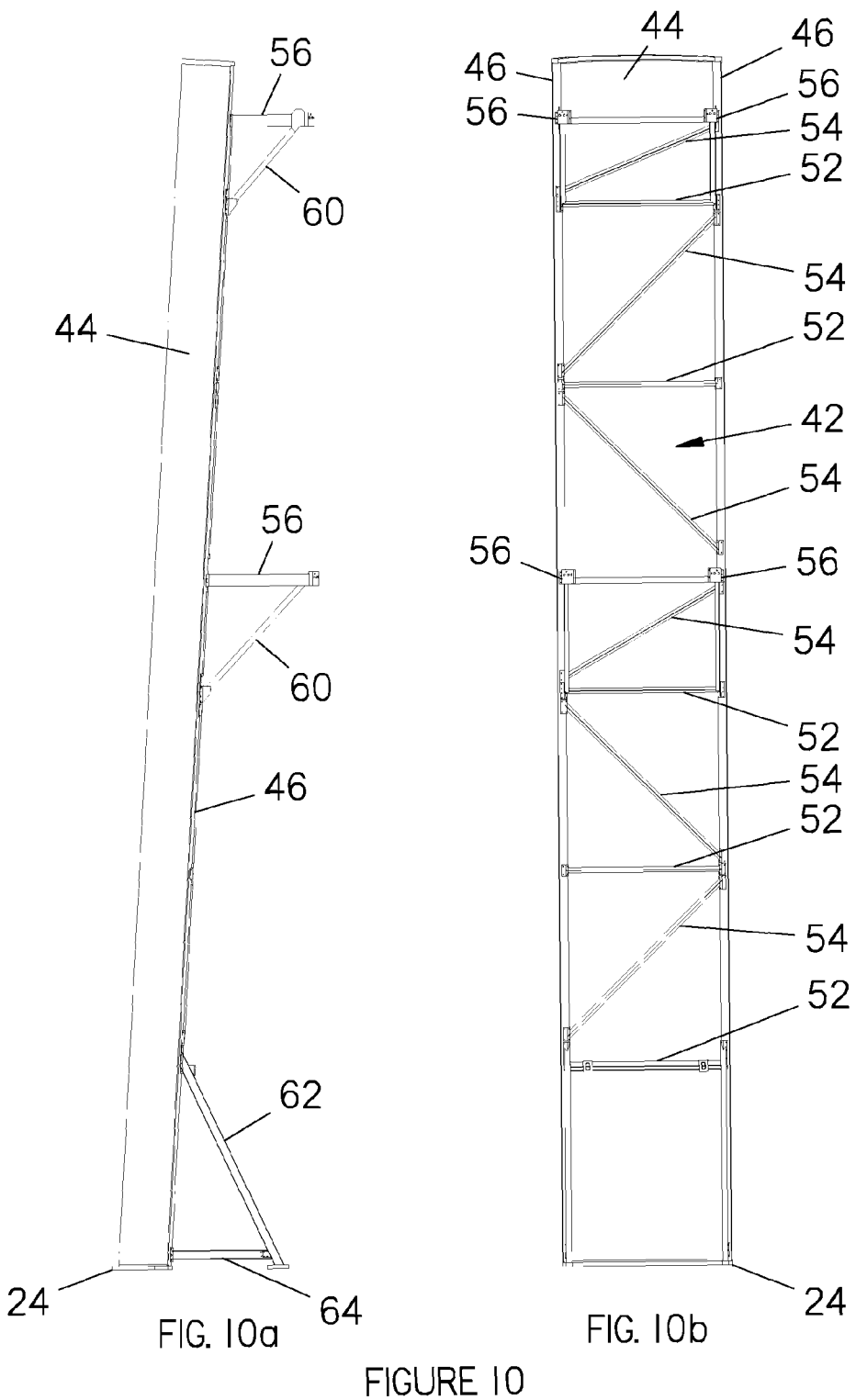
FIG. 10 includes

As shown in FIGS. 8 and 9, adjacent peripheral sections 38 are connected to one another through the connecting structural members 56, which have an inner end, distal from the longitudinal side edges 46, connected to an inner end of one of the connecting structural members 56 of the adjacent peripheral sections 38. Structural concavities 40 are defined between the adjacent peripheral sections 38 by the connecting structural members 56 since they extend inwardly from the longitudinal side edges 46 of the convex-shaped walls 44, towards the central section 36. The base section 28 of the structural tower 22 thus includes a combination of structural convexities and structural concavities created by the combination of the convex-shaped walls 44 and connecting structural members 56 extending inwardly from the convex-shaped walls 44. In an embodiment, the structural components of the base section 28 of the structural tower 22 consists of components defining together the structural convexities and structural concavities of the structural tower 22, including the inner framework 42 extending in the peripheral sections 38 and connecting the latter together.

The configuration of the inner framework 42 can vary from the embodiment shown. For instance, the inner framework 42 can include more or less structural members and their configuration can differ. The transversal, connecting, reinforcing, diagonally extending structural members can be replaced by other structural members. Furthermore, the inner framework 42 can be free of reinforcing and diagonally extending structural members (or members). In an embodiment, the side walls 44 can be replaced by a lattice framework (not shown) including a plurality of connecting structural members 56 and reinforcing structural members 60.

In an embodiment, the peripheral ends of two connecting structural members 56 can be directly connected together or through an intermediate structural member.

The number of peripheral sections 38 can vary from the embodiment shown. For instance, the structural tower 22 can include two or more peripheral sections 38 extending peripherally from a central section 36. In an embodiment, the structural tower 22 can include three or more peripheral sections 38 extending peripherally from the central section 36. The shape of the central section 36 and the peripheral sections 38 can vary from the embodiment shown.

The structural tower components can be transported unassembled and assembled on site. For instance and without being limitative, each convex-shaped panel can be transported independently, or secured to adjacent side wall panels, if any. For transportation purposes, the peripheral sections can include their inner framework or the inner framework, entirely or partially, can be mounted on site.

In the embodiment shown, the central section 36 is free of structural members extending between two peripheral sections, outwardly thereof. In an embodiment, the central section 36 can include components extending between two peripheral sections, inside the structural tower 22. In an embodiment, the components extending between two peripheral sections, in the central section 36, are non-structural components.

In the embodiment shown, the structural tower 22 is free of structural members extending between two adjacent convex-shaped walls 44, in the structural concavities 40. In an embodiment, two adjacent convex-shaped walls 44 can be joined by an outer wall (not shown) for aesthetic purposes. However, the outer wall does not substantially rigidify the structural tower 22 but is added for aesthetic purposes. The outer wall can replace the two side walls 44, providing a substantially frusto-conical outer shape to the base section 28 of the structural tower 22. In this embodiment, even if the outer shape is substantially frusto-conical, the structural shape of the base section 28 of the structural tower 22 is provided by a combination of structural convexities and structural concavities created by the combination of the convex-shaped walls 44 and connecting structural members 56 extending inwardly from the convex-shaped walls 44.

Figure 12:
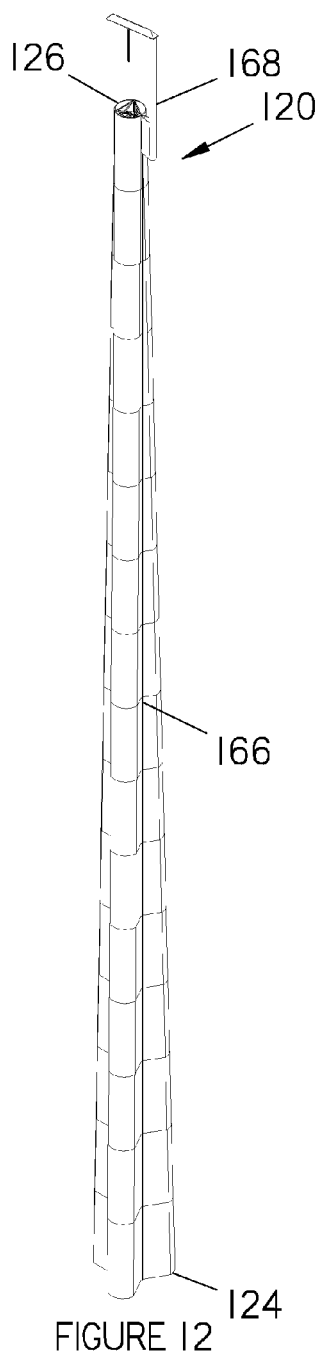
FIG. 12 is a perspective view of a wind turbine tower assembly in accordance with another embodiment, wherein an inner framework of the peripheral sections includes a longitudinally extending rail member.

Referring now to FIG. 12, there is shown an alternative embodiment of the wind turbine tower assembly 20 wherein the features are numbered with reference numerals in the 100 series which correspond to the reference numerals of the previous embodiment. The inner framework 142 of the structural tower 122 includes additional components to support a longitudinally extending rail member 166 as will be described in more details below.

In the embodiment shown in FIG. 12, the structural tower 122 includes only one section including a combination of peripheral sections 138 and a central section 136 extending from the lower end 124 to the upper end 126 with the cross-sectional area of the peripheral sections 138 decreasing from the lower end 124 to the upper end 126. The structural tower 122 has a substantially clover shape from the lower end 124 to the upper end 126 with the cross-sectional shape of the structural tower 122 being substantially circular at the upper end 126.

The external shape of the structural tower 122 is similar to the external shape of the structural tower 22, except that it includes the longitudinally extending rail member 166 extending longitudinally between two adjacent peripheral sections 138 of the structural tower 122, inwardly of the convex-shaped walls 144. The rail member 166 is designed to support a translatable crane 168 for hoisting a wind turbine and blade assembly (not shown) to the upper end 26 of the structural tower 122. The translatable crane 168 can also be used to erect the structural tower 122 by hoisting and supporting upper portions thereof.

Figure 13:
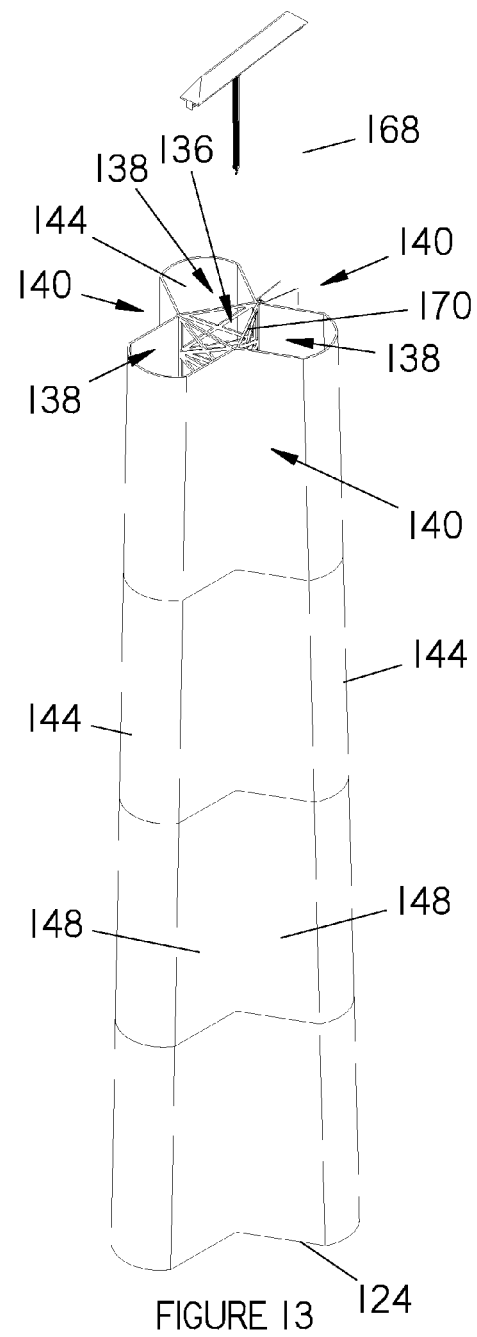
FIG. 13 is a perspective view of a section of the wind turbine tower assembly shown in FIG. 12, wherein an upper section has been removed.

Referring now to FIGS. 13 and 14, there is shown that, in addition to components of the inner framework 142 (not shown in FIGS. 12 to 15) similar to the ones described above in reference to FIGS. 1 to 11, the inner framework 142 further comprises a triangular latticework 170. The triangular latticework 170 delimitates the central section 136. It extends between the connecting peripheral ends of the connecting structural members 156 of adjacent peripheral sections 138.

It is appreciated that the shape of the latticework 170 can vary in accordance with the shape of the structural tower 122. For instance and without being limitative, the latticework can be rectangular if the structural tower includes four peripheral sections.

Referring now to FIG. 15, there is shown that the triangular latticework 170 includes three panels 172 configured in a triangular configuration, each panel including two longitudinally extending members 174, each being secured to one of the longitudinally extending members 174 of an adjacent panel 172, a plurality of spaced-apart horizontally extending members 176 extending between the two longitudinally extending members 174 of one of the panels 172 and a plurality of diagonally extending members 178 provided in pairs defining together an "X" shaped component and also extending between the two longitudinally extending members 174 of one of the panels 172.

The longitudinally extending rail member 166 is mounted to the triangular latticework 170 at the junction of two adjacent and connected longitudinally extending members 174 of adjacent panels 172.

In the embodiment shown, the longitudinally extending rail member 166 extends from the lower end 124 to the upper end 126 of the structural tower 122. In an alternative implementation, the longitudinally extending rail member 166 can extend only along a section of the structural tower 122. The longitudinally extending rail member 166 is located in one of the structural concavities 140 of the structural tower 122, between two adjacent peripheral sections 138. It is appreciated that the structural tower 122 can include more than one longitudinally extending rail member 166.

Moreover, although the embodiments of the wind turbine tower assembly and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperations thereinbetween, as well as other suitable geometrical configurations, may be used for the wind turbine tower assembly, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A structural tower for a wind turbine assembly, comprising, along at least a base section thereof: a central section; and a plurality of peripheral sections extending peripherally of the central section, each one of the peripheral sections including a convex-shaped wall having two longitudinal side edges and an inner framework secured to a respective one of the convex-shaped walls and extending inwardly in the respective one of the peripheral sections, the inner framework comprising a plurality of transversal structural members extending between and being secured to the two longitudinal side edges of the respective one of the convex-shaped walls together and a plurality of pairs of connecting structural members extending inwardly towards the central section, each connecting structural member of a pair of the plurality of pairs having a peripheral end adjoined and connected to a respective one of the longitudinal side edges and an inner end adjoined and connected to an inner end of a respective one of the connecting structural members of an adjacent one of the peripheral sections to define a substantially V-shaped structural concavity between adjacent ones of the peripheral sections, wherein along a majority of a length of the base section, the peripheral sections and the structural concavities are provided in an alternating configuration, peripherally to the central section.

2. A structural tower for a wind turbine assembly, comprising, along at least a base section thereof: a central section; and a plurality of peripheral sections extending peripherally of the central section, each one of the plurality of peripheral sections including a convex-shaped wall having two longitudinal side edges and an inner framework secured to the convex-shaped walls and extending inwardly in a respective one of the plurality of peripheral sections, the inner framework comprising a plurality of transversal structural members extending between and being secured to the two longitudinal side edges of the convex-shaped wall together and a plurality of pairs of connecting structural members extending inwardly towards the central section, each connecting structural member of a pair of the plurality of pairs having a peripheral end adjoined and connected to a respective one of the longitudinal side edges and an inner end adjoined and connected to an inner end of a respective one of the connecting structural members of an adjacent one of the plurality of peripheral sections, the adjoined and connected connecting structural members defining a substantially V-shaped structural concavity between adjacent ones of the plurality of peripheral sections and peripherally to the central section, wherein adjacent ones of the convex-shaped walls are spaced apart from one another along a periphery of the base section and a majority of a length of the base section, with a respective one of the structural concavities extending between the adjacent ones of the convex-shaped walls.

3. The structural tower as claimed in claim 2, wherein the convex-shaped walls of the plurality of peripheral sections are configured in a tapered configuration from a lower end to an upper end thereof and upper ends of the convex-shaped walls are configured in an adjoining configuration.

4. The structural tower as claimed in claim 2, wherein a cross-sectional area of the central section is substantially uniform along the base section, a cross-sectional area of the plurality of peripheral sections decreases from a lower end to an upper end of the base section, and the convex-shaped wall of each of the plurality of peripheral sections is an arc of a circle.

5. The structural tower as claimed in claim 2, wherein the plurality of peripheral sections extends radially from the central section, the substantially V-shaped structural concavities are defined outside the peripheral sections, the central section is free of a structural member extending therein and the structural concavities are free of a structural member extending between two adjacent ones of the convex-shaped walls.

6. The structural tower as claimed in claim 2, wherein a length of the connecting structural members decreases from a lower end to an upper end of the base section and the connecting structural members extending from a respective one of the convex-shaped walls extend substantially parallel to one another.

7. The structural tower as claimed in claim 2, wherein the transversal structural members connecting the two longitudinal side edges of a respective one of the convex-shaped walls are spaced apart along the longitudinal side edges and extend substantially parallel to one another and at least one of the transversal structural members extends between a corresponding one of the pairs of the connecting structural members.

8. The structural tower as claimed in claim 2, wherein the inner framework further comprises at least one platform secured to at least one of the pairs of the connecting structural members and extending therebetween and structural members extending between and connecting the inner ends of a corresponding one of the pairs of the connecting structural members.

9. The structural tower as claimed in claim 2, further comprising at least one rail member extending at least partially along the structural tower, and the at least one rail member extends in at least one of the structural concavities and is mounted to the adjoined and connected inner ends of the connecting structural members.

10. The structural tower as claimed in claim 2, wherein the plurality of peripheral sections extend along the base section of the structural tower and the structural tower further comprises a frusto-conical upper section extending upwardly from an upper end of the base section.

11. The structural tower as claimed in claim 2, wherein the base section extends from a lower end to an upper end of the structural tower.

12. The structural tower as claimed in claim 2, wherein the base section has a substantially circular cross-section at an upper end thereof.

13. The structural tower as claimed in claim 2, wherein the structural tower further comprises side walls juxtaposed to the connecting structural members, outwardly thereof.

14. The structural tower as claimed in claim 13, wherein each one of the side walls extends from the peripheral end to the inner end of a corresponding one of the connecting structural members.

15. A wind turbine tower assembly comprising a structural tower with a base section, the base section of the structural tower comprising:
   at least three convex-shaped walls, each one of the at least three convex-shaped walls having two longitudinal side edges, spaced apart from the longitudinal side edges of adjacent ones of the convex-shaped walls at least along a majority of a length of the base section; and
   at least three inner frameworks, each one of the at least three inner frameworks being secured to each of the at least three convex-shaped walls, each of the at least three inner frameworks comprising a plurality of transversal structural members extending between and being secured to the two longitudinal side edges of a respective one of the at least three convex-shaped walls and a plurality of connecting structural members having a peripheral end adjoined and connected to one of the two longitudinal side edges of the at least three convex-shaped walls, and an inner end, the plurality of connecting structural members extending inwardly towards a central section of the base section of the structural tower with the inner ends being adjoined and connected to the inner end of another one of the plurality of connecting structural members with the peripheral end adjoined and connected to a different and adjacent one of the at least three convex-shaped walls to provide connected inner ends and to define a substantially V-shaped structural concavity between adjacent ones of the convex-shaped walls and inwardly of the convex-shaped wall and peripherally to the central section.

16. The wind turbine tower assembly as claimed in claim 15, wherein the at least three convex-shaped walls are configured in a tapered configuration from a lower end to an upper end of the base section, upper ends of the at least three convex-shaped walls are configured in an adjoining configuration to define the central section of the base section of the structural tower, a cross-sectional area of the central section is substantially uniform from the lower end to the upper end of the base section of the structural tower, and the central section is free of structural member extending therein.

17. The wind turbine tower assembly as claimed in claim 15, wherein each of the at least three convex-shaped walls and corresponding ones of the plurality of connecting structural members having a respective peripheral end secured thereto define a peripheral section extending peripherally and radially from the central section of the base section of the structural tower, wherein adjacent ones of the peripheral sections are spaced apart from one another with a respective one of the structural concavities extending between the adjacent ones of the peripheral sections, a profile of each one of the at least three convex-shaped walls is an arc of a circle, and a cross-sectional area of the plurality of peripheral sections decreases from a lower end to an upper end of the base section.

18. The wind turbine tower assembly as claimed in claim 15, wherein the structural concavities are free of a structural member extending between two adjacent ones of the at least three convex-shaped walls and a length of the plurality of connecting structural members decreases from a lower end to an upper end of the base section.

19. The wind turbine tower assembly as claimed in claim 15, wherein the transversal structural members connecting the two longitudinal side edges of the respective one of the at least three convex-shaped walls are spaced-apart from one another along the two longitudinal side edges and extend substantially parallel to one another.

20. The wind turbine tower assembly as claimed in claim 15, further comprising at least one rail member extending at least partially along the structural tower and the at least one rail member extends in at least one of the structural concavities and is mounted to the adjacent and connected inner ends of the connecting structural members.

21. The wind turbine tower assembly as claimed in claim 15, wherein the structural tower further comprises a frusto-conical upper section extending upwardly from an upper end of the base section and the base section has a substantially circular cross-section at an upper end of the base section.

22. The wind turbine tower assembly as claimed in claim 15, wherein the base section extends from a lower end to an upper end of the structural tower and the base section has a substantially circular cross-section at an upper end of the base section.

23. The wind turbine tower assembly as claimed in claim 15, wherein the plurality of connecting structural members extending from the respective one of the at least three convex-shaped walls extend substantially parallel to one another and the plurality of connecting structural members are provided in pairs extending from a respective one of the two longitudinal side edges and wherein at least one of the transversal structural members extends between a corresponding one of the pairs of the plurality of connecting structural members.

24. The wind turbine tower assembly as claimed in claim 23, wherein at least one of the at least three inner frameworks further comprises at least one platform secured to a respective one of the pairs of the plurality of connecting structural members and extending therebetween and at least one of the at least three inner frameworks further comprises structural members extending between the inner ends of at least one of the pairs of the plurality of connecting structural members.

25. The wind turbine tower assembly as claimed in claim 15, wherein the structural tower further comprises side walls juxtaposed to the plurality of connecting structural members, outwardly thereof.

26. The wind turbine tower assembly as claimed in claim 25, wherein each one the side walls extend from the peripheral end to the inner end of a corresponding one of the plurality of connecting structural members.

* * * * *